Patented June 24, 1930

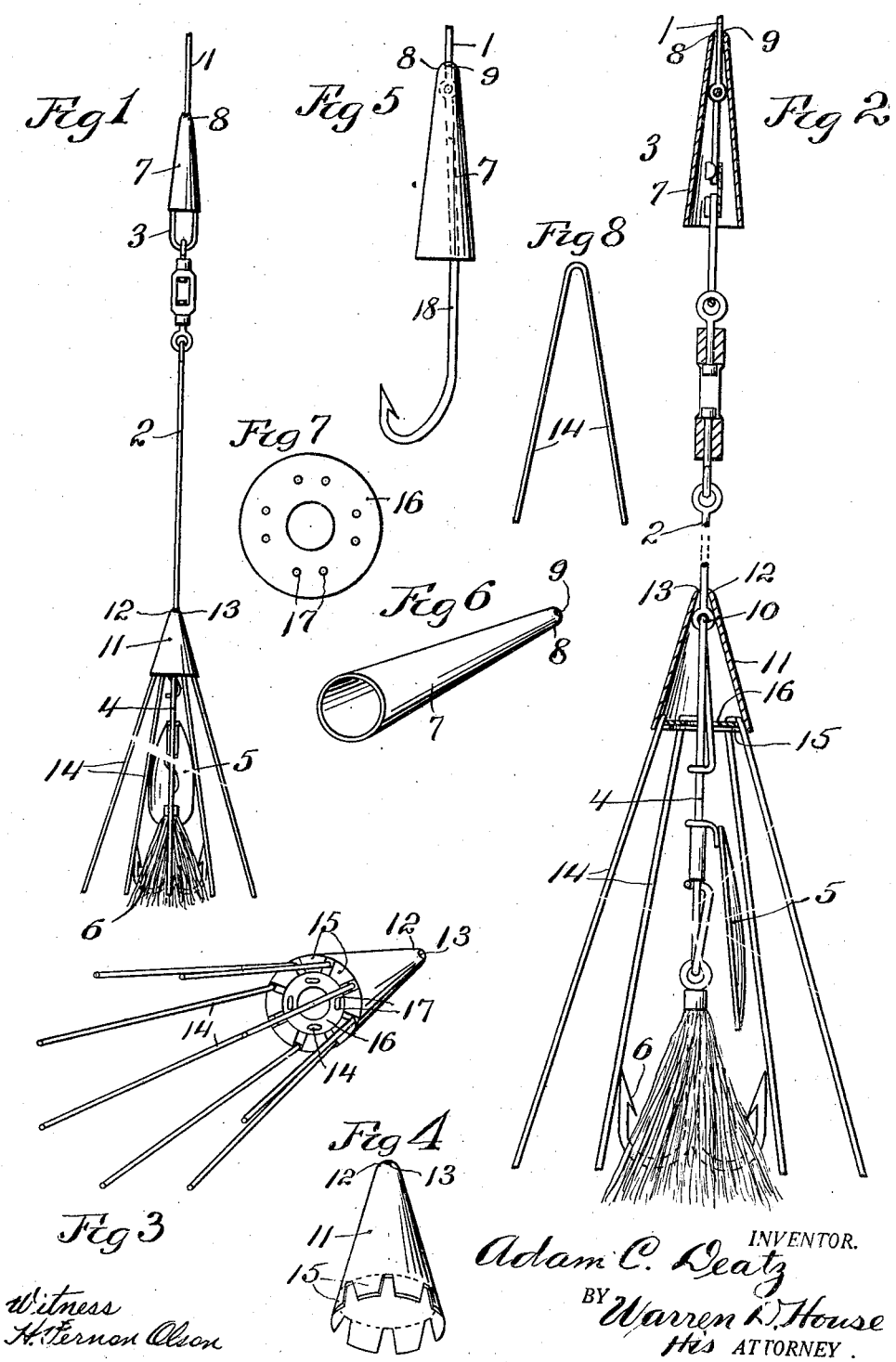

1,768,033

UNITED STATES PATENT OFFICE

ADAM C. DEATZ, OF KANSAS CITY, MISSOURI

WEED GUARD FOR FISHING LINES

Application filed April 8, 1929. Serial No. 353,459.

My invention relates to improvements in weed guards for fishing lines.

One of the objects of my invention is to provide a novel weed guard which is adapted to be mounted on a fishing line so as to cover the place of attachment of the fish hook to the line and to be supported by the attaching means.

A further object of my invention is to provide a novel weed guard which will serve to guard weeds from catching on the attaching means between the fish hook and the line and also guard the hook barbs from catching weeds, without interfering with the operation of the hook.

The novel features of my invention are hereinafter fully described and claimed.

In the accompanying drawing which illustrates my invention—

Fig. 1 is a reduced side elevation of my improved guards mounted on a fishing line attached to a spoon hook.

Fig. 2 is an enlarged side view partly in vertical section, partly in elevation, and partly broken away, of what is shown in Fig. 1.

Fig. 3 is an enlarged perspective view of my improved guard having the guard wires.

Fig. 4 is an enlarged perspective of the conical body of the guard, which is provided with guard wires, as the body appears before the lips thereof are inwardly turned.

Fig. 5 is an enlarged side elevation of the upper guard, shown in Figs. 1 and 2, and which is mounted on a line connected to a fish hook having a single barb and no spinner.

Fig. 6 is a perspective view of the upper weed guard.

Fig. 7 is an enlarged plan view of the ring plate.

Fig. 8 is a reduced side view of one of the V shaped wires before being bent.

Similar reference characters designate similar parts in the different views.

Referring to Figs. 1 and 2, 1 designates an ordinary fishing line, 2 a leader connected by usual attaching means 3 to the main part 1 of the fishing line, and 4 an ordinary spoon bait stem attached to the leader 2 and supporting in the usual manner spoon or spinner 5 and a fish hook 6.

7 designates the upper weed guard comprising an upwardly converging, or downwardly flaring tubular member, preferably conical, and having a rounded apex 8, which is relatively small, and which is provided with a hole 9 through which the line 1 extends.

The weed guard 7 is supported by the attaching means 3, and covers the place of attachment of the line 1 to the attaching means 3.

For preventing weeds catching on the stem 4, at the place of attachment thereto of the leader 2, which place of attachment is designated by 10, in Fig. 2, I provide a lower downwardly flaring tubular weed guard body 11, preferably conical, as shown, and which is provided with a relatively small rounded apex 12, having therethrough a hole 13 through which the leader 2 extends.

For preventing weeds catching on the hook 6, or on the parts below the conical guard 11, the latter has attached to it downwardly flaring resilient guard wires 14, which preferably extend slightly below the hook 6, and which are disposed around said hook, as shown, and which may be attached to the guard body 11, as below described.

The lower edge of the member 11, as shown in Fig. 4, is provided with spaced apart lips 15, as shown in Fig. 4, said lips being then turned inwardly, as shown in Figs. 2 and 3, soldered, or otherwise fastened to the upper sides of the lips 15 is a flat ring plate 16, which is provided with a circular row of holes 17 concentric with the circular row of holes between the lips 15.

The wires 14 are preferably V shaped members, of which the wires 14 are the arms.

In the making of the device the arms 14 of the V shaped members, one of which is shown in Fig. 8, are respectively inserted through the pairs of holes 17 from the lower side of the plate 16, and are then bent laterally and then downwardly through the holes between the lips 15 and past the periphery of the plate 16, as shown in Fig. 2.

As shown in Fig. 3, the transverse portion of each guard wire 14 bears against the under side of the plate 16. By means of this arrangement the guard wires are held securely without soldering or other accessory means.

The parts having been assembled as described, the upper guard 7, in use, will deflect the weeds so that they can not catch at the place of attachment on the line 1 to the attaching means 3.

The guard 11 and wires 14 will prevent the weeds catching on the attaching means between the leader 2 and the stem 4 of the spoon bait, or from catching upon the hook 6 or upon the parts below the guard 11.

Referring to Fig. 5, which shows the guard 7 mounted on a line 1, which is attached to a single hook 18, in the manner usually employed, the guard 7 prevents the weeds catching at the place of attachment of the line 1 to the hook 18.

I do not limit my invention to the structure shown and described, as modifications, within the scope of the appended claims, may be made without departing from the spirit of my invention.

What I claim is:—

1. In a weed guard for a fishing line, a downwardly flaring tubular guard having a relatively small apex provided with an opening adapted to receive therethrough a fishing line, said guard having a bottom having an opening adapted to receive a means for attaching a hook to said line, said bottom having two concentric rows of holes, and V shaped guard wires each of which bears at its transverse portion against the under side of said bottom and has its arms extended upwardly through two of the holes of one of said rows and thence laterally, downwardly and outwardly through two holes in the other row.

2. In a weed guard for a fishing line, a downwardly flaring tubular guard having a relatively small apex provided with an opening adapted to receive therethrough a fishing line, said guard having a bottom comprising inwardly spaced apart lips and a plate fastened to said lips and provided with an opening adapted to receive a means for attaching a hook to said line and having a row of holes concentric with the holes between said lips, and V shaped guard wires each of which bears at its transverse portion against the under side of said plate and has its arms extended upwardly through two of the holes of said plate and thence laterally downwardly and outwardly through two holes between said lips.

In testimony whereof I have signed my name to this specification.

ADAM C. DEATZ.